(12) United States Patent
Hishiki

(10) Patent No.: US 6,837,781 B2
(45) Date of Patent: Jan. 4, 2005

(54) POLISHING PAD

(75) Inventor: Seigo Hishiki, Nagoya (JP)

(73) Assignee: Rogers Inoac Corporation, Tokyo (JP)

( * ) Notice: Subject to any disclaimer, the term of this patent is extended or adjusted under 35 U.S.C. 154(b) by 163 days.

(21) Appl. No.: 10/206,951

(22) Filed: Jul. 30, 2002

(65) Prior Publication Data

US 2003/0109209 A1 Jun. 12, 2003

(30) Foreign Application Priority Data

Aug. 24, 2001 (JP) ..................................... P2001-254971

(51) Int. Cl.[7] ............................................. B24D 11/00
(52) U.S. Cl. .......................... 451/527; 451/41; 451/59; 451/526; 451/528; 451/529; 451/534; 451/539; 156/345.12; 156/345.13
(58) Field of Search ........................... 451/527, 41, 49, 451/526, 528, 529, 534, 539, 59; 156/345.12, 345.13

(56) References Cited

U.S. PATENT DOCUMENTS

| | | | |
|---|---|---|---|
| 6,171,181 B1 * | 1/2001 | Roberts et al. | 451/527 |
| 6,328,644 B1 * | 12/2001 | Kuramochi et al. | 451/526 |
| 6,361,409 B1 * | 3/2002 | Vishwanathan et al. | 451/56 |
| 6,575,824 B2 * | 6/2003 | Kuramochi et al. | 451/527 |
| 6,648,733 B2 * | 11/2003 | Roberts et al. | 451/41 |

* cited by examiner

Primary Examiner—Lee D. Wilson
(74) Attorney, Agent, or Firm—Sughrue Mion, PLLC

(57) ABSTRACT

A high quality polishing pad suitable for chemical mechanical polishing (CMP) of semiconductor wafer, etc. which is not affected by the change of polishing conditions during polishing and can attain excellent removal rate, capacity of step height reduction and uniformity is described, wherein a polyurethane-based foam 12 having fine and uniform cells 20 suitable for polishing of semiconductor material, etc. obtained by reaction-injection molding a gas-dissolved raw material prepared by dissolving an inert gas in a mixture of a polyurethane or polyurea as a main raw material and various subsidiary raw materials under pressure is used.

12 Claims, 3 Drawing Sheets

POLISHING PAD

FIELD OF THE INVENTION

The present invention relates to a polishing pad and more particularly to a polishing pad suitable for chemical mechanical polishing (CMP) which can polish a member having high requirements for precision and surface flatness such as semiconductor wafer.

BACKGROUND OF THE INVENTION

One of the important technologies supporting the recent rapid technical progress is the development of information technology, such as the computer. It is not too much to say that the development of performance of the aforementioned information technology can be attained by the development of performance and integration of the CPU (central processing unit) of information engineering equipment, i.e., ULSI (ultra large scale integrated) device constituting CPU. As one of the methods for drastically developing the performance and integration of ULSI devices, a method has been practiced which comprises developing the horizontal integration of ULSI, i.e., finely dividing elements, while developing the vertical integration of ULSI, i.e., multi-level interconnection of ULSI.

The most important factor of the aforementioned multi level interconnection of ULSI is to secure the depth of focus (DOF) of optical lithography by which the wafer is exposed to light through a pattern for metal wiring such as inter-layer dielectrics and metal wiring. In other words, it is required that the difference in height between rise and indentation in roughened surface be smaller than the DOF of the exposing light for patterning. To this end, leveling must be made with a high precision. In the process for forming a multi level interconnection, when there is a difference in height between rise and indentation in the inter-layer dielectrics or metal wiring, it is made impossible to effect sufficient focusing or form a fine wiring structure.

It is difficult to attain a high precision leveling by conventional SOG (spin on glass) or etching. As a substitute for these methods there has been normally used super precision polishing such as CMP (chemical mechanical polishing). The leveling by CMP is carried out by using an abrasive (normally referred to as "slurry", which will be used hereinafter) having a particulate material such as silica and alumina dispersed in admixture in an alkaline or acidic chemically-corrosive aqueous solution and an elastic polishing material (hereinafter referred to as "polishing pad") against the surface of an object to be leveled such as semiconductor wafer.

As the aforementioned polishing pad, there has been used a non-woven fabric or an elastic foam of polyurethane or the like. Particularly preferred among these materials is foamed polyurethane, which discharges no lint during polishing and has a surface cell structure capable of retaining the slurry. This surface cell structure can be produced in a controlled environment. The polishing pad made of the polyurethane foam has been heretofore produced by a process which comprises preparing a large block polyurethane foam (hereinafter referred to as "cake") by a chemical foaming method under material and molding conditions arranged such that predetermined physical properties such as hardness and elasticity are provided, slicing the cake into a sheet having a predetermined thickness, and then punching the sheet into a shape, such as a disk, that is suitable for polishing.

However, the polishing pad produced by chemical foaming method is disadvantageous in that the size and dispersion of cells which are formed inside and have a great effect on the retention of the slurry governing the flatness of the final product cannot be sufficiently controlled and thus become non-uniform, making it difficult to perform polishing precisely enough to attain sufficient flatness.

The cake is sliced at a separate cutting step to obtain a sheet-shaped product on which a polishing pad having a predetermined thickness is produced. Therefore, the final polishing pad product has a surface flatness depending on the precision of the cutting step. However, since this precision is not sufficiently high, the precision in leveling of the object to be leveled is decided at the stage of selecting the material of the polishing pad. It is known that when a polymer material such as polyurethane foam is subjected to slicing or cutting, the viscoelasticity of the polymer material normally causes dislocation of blade cutting margin, i.e., so-called relief at the cutting portion, making it difficult to perform control to a precision of not greater than 10 $\mu$m.

On the other hand, improving polishing conditions (low pressure and high relative velocity polishing) or enhancement of hardness of the polishing pad can improve the leveling in the CMP. However, it is difficult to attain the former means due to the change of physical properties, i.e., viscoelasticity of polishing pad during polishing. The latter means is disadvantageous in that it is difficult to effect the predetermination of enhancement of hardness. Thus, it is apprehended that when the hardness thus attained is too high, the surface of the object to be polished can be scratched (damaged) by the polishing pad. The enhancement of hardness can be somewhat attained also by the enhancement of density. However, taking into account the retention of slurry on the surface of the polishing pad (capacity of rendering the amount of the slurry to be supplied into the surface of the wafer constant), a preparation method which cannot form fine cells, such as ordinary chemical foaming method and physical foaming method, encounters difficulty in cell distribution in proportion to enhancement of density, making it impossible to attain uniform distribution of cells. Further, as one of the aforementioned improvements in polishing conditions there has recently been proposed the use of a linear polishing type polishing pad having a long perimeter. However, this approach requires investment of funds for large-scale facilities, such as new polishing machines, and thus cannot be easily introduced, though being possibly a basic solution to these problems.

For CMP utilized particularly for isolation called shallow trench isolation (STI), a low pressure and high relative velocity polishing with a high hardness pad has been proposed as a device for lessening the dependence on isolation pattern. However, this approach is disadvantageous in that a polishing pad made of a polyurethane foam, if used, is subject to instantaneous rise of surface temperature due to friction with the surface of the object to be polished during polishing. As a result, the viscoelasticity of the surface of the polishing pad changes, rendering the removal rate, i.e., amount polished per unit time instable.

SUMMARY OF THE INVENTION

In the light of problems with polishing pads according to the related art, the invention has been proposed to solve fairly these problems. An aim of the invention is to provide a high quality polishing pad suitable for chemical mechanical polishing (CMP) of semiconductor wafer, etc. which is not affected by the change of polishing conditions during polishing and can attain excellent removal rate, step height reduction and uniformity within wafer.

In order to overcome the aforementioned problems and accomplish the predetermined aim, the polishing pad according to the invention comprises a polyurethane-based foam having a desired shape obtained by a process which comprises mixing a polyurethane or polyurea as a main raw material with various subsidiary raw materials, dissolving an inert gas in the mixture under pressure to obtain a gas-dissolved raw material, and then injecting the gas-dissolved raw material into a mold by a reaction injection molding method, wherein the polyurethane-based foam has fine and uniform cells suitable for polishing of semiconductor material or the like obtained by the reaction in the injection mold.

DESCRIPTION OF THE REFERENCE NUMERALS AND SIGNS

12 Polyurethane-based foam
20 Cell
58 Reaction injection mold

DETAILED DESCRIPTION OF THE INVENTION

The polishing pad according to the invention will be further described hereinafter with reference to preferred embodiments. The inventors found that when a gas-dissolved raw material obtained by dissolving an inert gas in a polyurethane-based raw material is formed by a reaction injection molding method while arbitrarily controlling physical properties such as hardness, cell diameter and density, a polyurethane-based foam which can be preferably used as a polishing pad that is resistant to change of polishing conditions, can maintain an excellent removal rate and step height reduction. The inventors also found that the use of an aromatic diamine for example as a crosslinking agent makes it possible to inhibit the change of viscoelasticity depended on the temperature of the polyurethane-based foam.

Figure 1:
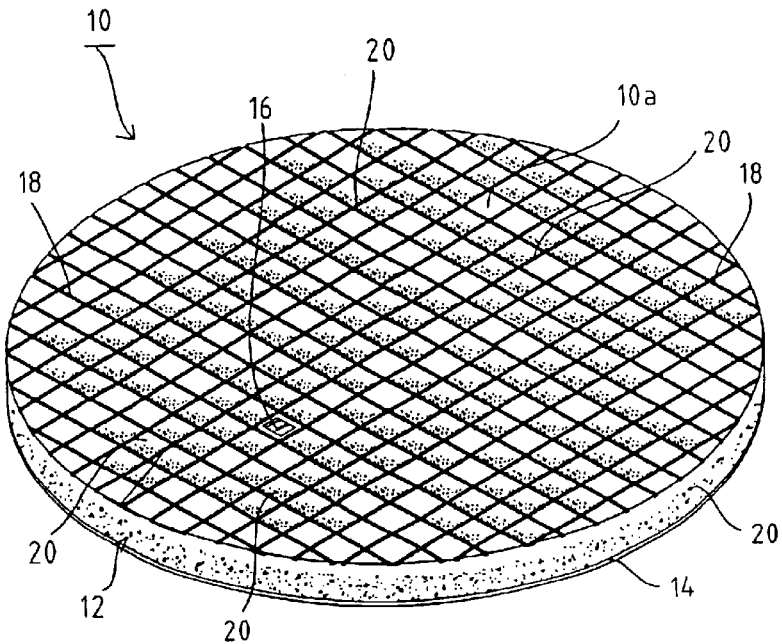
FIG. 1 is a perspective view illustrating a polishing pad according to a preferred embodiment of the invention.

As shown in FIG. 1, the polishing pad 10 according to the present embodiment is in the form of circular sheet and essentially comprises a polyurethane-based foam 12 constituting a polishing surface 10a and a buffer pad 14 integrally laminated on substantially the whole surface of one side of the foam 12. The polishing pad 10 is provided at a portion thereof with a window 16 for end point detection of polishing, having a translucency and extending along the entire length in the thickness direction of the pad 10 through which the condition of the polished surface of the object to be leveled can be always confirmed during the use of the pad. The window 16 is preferably made of a solid resin or the like which is the same as that of the polyurethane-based foam 12. This is because when the window 16 is made of the same material as the polyurethane-based foam 12 constituting the polishing surface 10a of the polishing pad 10, the window 16 can fairly fit the polyurethane-based foam 12 formed by reaction injection molding, making it possible to prevent the window 16 from being separated from the polishing pad 10 during polishing.

Figure 2:
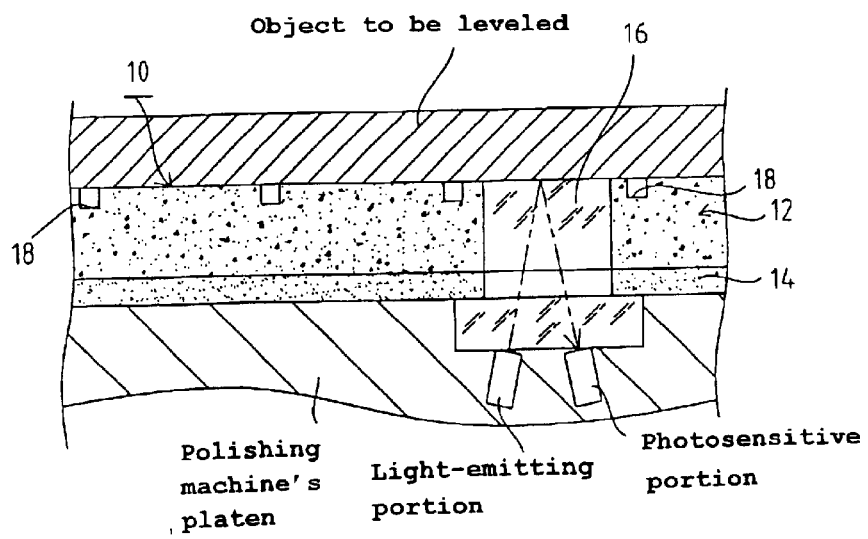
FIG. 2 is a schematic view illustrating how polishing is effected using a polishing pad provided with a front window for the end point detection of polishing.

The polishing pad 10 provided with the window 16 can be provided with a polishing platen comprising a required light-emitting portion and a photosensitive portion as shown in FIG. 2 to perform polishing while confirming how the polished surface of the object to be leveled is polished. This minimizes the working margin required for polishing, making it possible to accomplish the reduction of polishing time and the efficient polishing.

The polishing surface 10a of the polishing pad 10 is provided with a lattice-shaped discharge groove 18 having a predetermined depth through which a polishing slurry and so-called polishing waste produced from the object to be polished during polishing are efficiently discharged out of the system. The optimum value of the depth of the discharge groove 18 depends on the material of the object to be leveled or the removal rate but is normally predetermined to a range of from about 0.1 to 0.5 mm. As the shape of the pattern of the discharge groove 18 there may be used circle, spiral or radiation concentric with the polishing pad 10 or a plurality of holes having a predetermined diameter besides the aforementioned lattice. However, the invention is not limited to these shapes. The discharge groove 18 may be in any shape so far as the aforementioned polishing waste can be efficiently discharged by movements such as rotation accompanying the polishing of the polishing pad 10 during polishing.

In order to facilitate the understanding of subsequent description of producing device for reaction injection molding method for producing the polishing pad 10, the outline of a device for producing a polishing pad 10 made of a polyurethane-based foam and reaction injection molding method will be described hereinafter.

Figure 3:
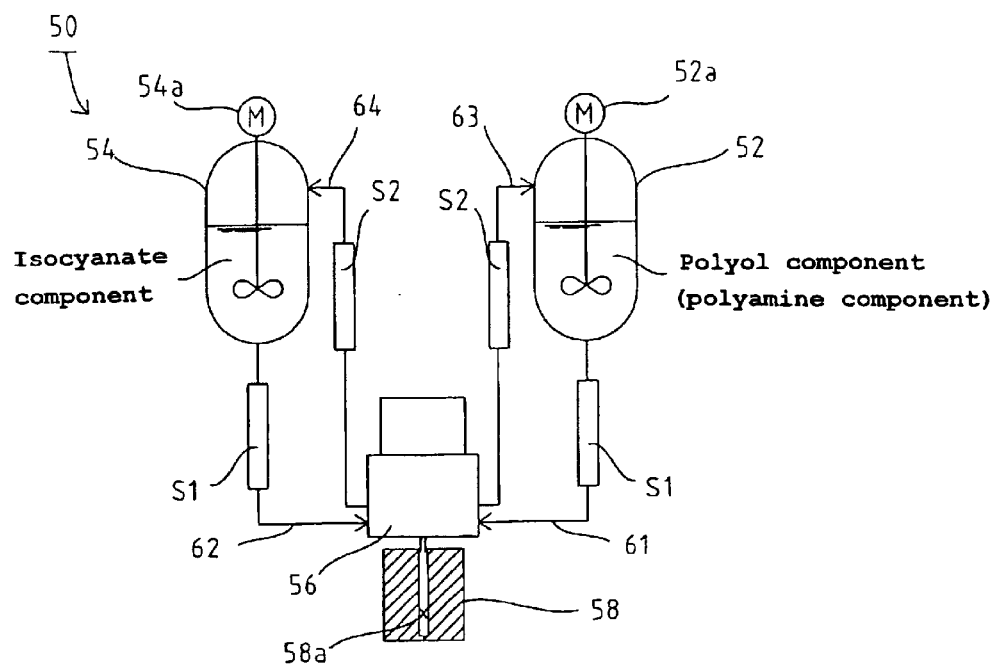
FIG. 3 is a schematic view illustrating an example of a reaction injection molding device for producing a polyurethane-based foam by a reaction injection molding method.

As shown in FIG. 3, the producing device 50 comprises a first raw material tank 52 for storing a polyol (polyamine) component, a second raw material 54 for storing an isocyanate component, a mixing head 56 and a reaction injection mold 58. The first raw material tank 52 and the second raw material tank 54 are connected to the mixing head 56 with feed pipes 61 and 62, respectively. The first and second raw material tanks 52 and 54 are provided with mixers 52a and 54a, respectively, so that the various raw materials stored in the raw material tanks 52 and 54 are stirred under control. The path from the first and second raw material tanks 52 and 54 to the mixing head 56 are each provided with an equipment S1 comprising a strainer, a feed pump such as metering pump, a high pressure filter, etc.

The mixing head 56 and the raw material tanks 52 and 54 are also connected to each other with return pipes 63 and 64 through which the various raw materials left uninjected are returned to the raw material tanks 52 and 54, respectively. The polyol component and the isocyanate component are cycled from the first and second raw material tanks 52 and 54 back to the first and second raw material tanks 52 and 54 through the mixing head 56, respectively, at a constant pressure of from about 0.1 to 50 MPa. The return pipes 63 and 64 from the mixing head 56 to the first and second raw material tanks 52 and 54, respectively, are each provided with an equipment S2 comprising a heat exchanger as necessary.

Explaining the reaction injection molding method with reference to a step of producing a polyurethane-based foam by the producing device 50, the interior of the first and second raw material tanks 52 and 54 are each compressed by an inert gas such as dried air or nitrogen gas to a constant pressure of from 0.1 to 50 MPa, where the feed pump is not out of order. The various raw materials in the raw material tanks 52 and 54 are stirred by means of mixers 52a and 54a, respectively, at a constant rate so that they are kept at a predetermined temperature. The upper inner portion of the raw material tanks 52 and 54 are each covered by an inert gas. In this arrangement, when the various raw materials undergo convection with stirring by the mixers 52a and 54a, the resulting bubbling causes the inert gas to be dissolved in the raw materials in a predetermined amount. In practice, it is not necessary that the inert gas be dissolved in both the polyol component and the isocyanate component. A predetermined subsidiary raw material such as catalyst, chain extender and/or crosslinking agent may be added to the polyol component having a high chemical stability in admixture. The inert gas may be then dissolved in the mixture to produce a gas-dissolved raw material.

The term "polyurethane" in the term "polyurethane-based foam" as used herein is meant to indicate the general term of a polymer having an urethane(urea) bond produced by the polyaddition reaction of an organic isocyanate with an active hydrogen compound. The polyurethane which has been actually used is synthesized by properly adding the aforementioned subsidiary raw materials to a polyisocyanate and a polyol as a base. The bases and the subsidiary raw materials may be properly combined to obtain polymers having various physical properties. As the inert gas there may be used $CO_2$, which exhibits a high diffusion coefficient. Besides $CO_2$, there may be used any available inert gas which does not affect the polyaddition reaction for synthesis of polyurethane such as $N_2$, Ar and dried air (normally not used because if a high moisture air is used, its water content reacts with the isocyanate to produce a gas that affects the foaming state of the foam).

As the polyol component there may be used a polyether polyol, polyester polyol, polycarbonate polyol or polydiene-based polyol. These polyols may be used singly or in combination of two or more thereof. As the polyamine component there is preferably used any material obtained by substituting the hydroxyl group in the polyol component by an amino group.

As the isocyanate component there may be used a toluene diisocyanate (TDI), TDI prepolymer, methylene diphenyl diisocyanate (MDI), crude MDI, polymeric MDI, urethodione-modified MDI, carbodimide-modified MDI or the like. These isocyanate components may be used in the form of prepolymer. The materials to be used herein are not limited to the various materials described herein.

Subsequently, the two raw materials are mixed in collision in the mixing head 56, and then injected into a reaction injection mold 58 comprising a cavity 58a having a shape conforming the external profile of the polishing pad 10 to be immediately produced and the inner pressure of which has been set to a predetermined value for a predetermined period of time. In this manner, the reaction and curing of the various raw materials thus mixed proceeds. At the same time, the inert gas dissolved in the mixture is released. The resulting expansion of the inert gas causes the mixture to be foamed to form a foam having a shape conforming the external profile of the cavity 58a. Accordingly, the buffer pad 14 and the window 16 can be easily mounted or formed by previously disposing the corresponding member in position in the reaction injection mold 58. The discharge groove 18 can be easily formed by shaping the cavity 58a according to the shape thereof.

Foaming can be effected by injecting the inert gas into the reaction injection mold 58 under conditions of from the gas saturation pressure to a lower or higher pressure so that the resulting action of pressure change such as reduction of pressure causes the inert gas to be released into the mixture. During this procedure, the release of the inert gas occurs at the same probability regardless of the site of occurrence so far as it occurs in the mixture of raw materials of the same equilibrium system having the inert gas dissolved therein. Further, the expansion of the inert gas thus released occurs at substantially the same rate everywhere in the system. Therefore, the inert gas can be released without causing any nonuniformity from site to site, i.e., uniformly and at random. Further, cells having substantially the same diameter can be formed. Moreover, since the release of the inert gas occurs in the same equilibrium system, the resulting cells have a substantially spherical form that exerts an effect of making the pressure of the foam uniform.

The expansion of the cells is essentially determined by the rate at which the mixture of raw materials undergoes reaction and curing. This demonstrates that the reaction rate can be controlled to control the degree of expansion of the cells, i.e., cell diameter. When the aforementioned reaction injection molding method is used, the two phase raw materials which have been mixed can be immediately injected into the mold 58 to undergo reaction and curing at a high rate. Thus, raw material compositions which cannot be molded by other molding methods can be used herein. Moreover, a foam having a smaller cell diameter can be produced.

The aforementioned reaction injection molding method is a producing method which has been heretofore used as a molding method for automobile interior and exterior parts. As the foaming method there may be properly used a so-called physical foaming method which comprises vaporizing a low-temperature volatilizing liquid such as low molecular weight chlorofluorohydrocarbon, methylene chloride and pentane from an uncured liquid reaction mixture to form cells, a so-called chemical foaming method which comprises adding water as a foaming agent to a polyol component, mixing the mixture with an isocyanate component, and then allowing the reaction with the isocyanate so that carbon dioxide is liberated as a foaming gas to form cells or a so-called mechanical foaming method which comprises blowing the inert gas into the reaction mixture or one of the two raw materials, and then shearing the material during stirring to form cells besides the aforementioned method involving the utilization of dissolution of inert gas. However, since these foaming methods can produce cells having a deteriorated uniformity in dispersibility or diameter, care must be taken in selecting these foaming methods.

In general, the foam obtained by the reaction injection molding method has a high density layer called skin layer having a thickness of few micrometers formed on the surface thereof. This skin layer can be easily removed during conditioning of the polishing pad, i.e., preparation (break-in) before use and thus causes no problems particularly in the purpose of polishing pad. A further reference can be made to a method involving the use of a supercritical fluid for the purpose of enhancing the rate of dissolution of inert gas as well as remarkably increasing the gas saturation concentration.

Figure 4:
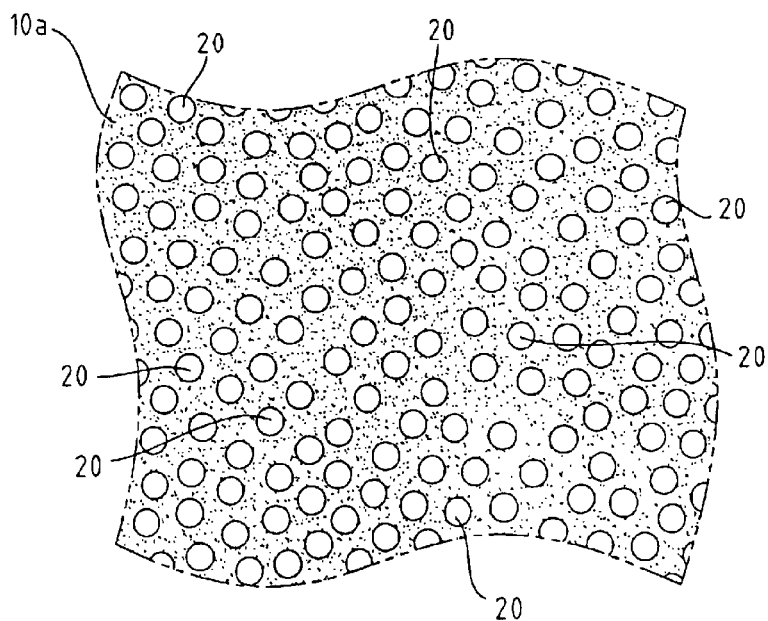
FIG. 4 is an enlarged plan view illustrating the polishing surface of a polishing pad.

Explaining the polishing surface 10a of the polishing pad 10 in an enlarged scale, numerous cells 20 having substantially the same diameter developed by the inert gas released by the aforementioned action are dispersed uniformly therein as shown in FIG. 4. The diameter of the cells 20 is affected by the reaction injection molding conditions described later, i.e., pressure in the reaction injection mold, gas saturation pressure (pressure in the raw material tank), the curing conditions (temperature, time), the gelation time, i.e., time between the point at which the raw material is injected and the point at which it is cured during the reaction injection molding.

The cell diameter decreases in inversed proportion to the increase in pressure in the mold, etc. and increases in proportion to the increase in gelation time under the condition under which the curing temperature lowers. The pressure in the mold and the curing temperature can be properly predetermined. The gelation time can be arbitrarily controlled by adjusting the reactivity of the raw material with a catalyst or the like. The cell diameter can be controlled also by the bulk density of the resulting foam as described later. The cell diameter can be controlled also by raising the viscosity of the raw material. However, this method can possibly worsen the completion of mixing, the fluidity in the mold, etc. and thus cannot be preferably used.

The average cell diameter is predetermined to a range of from 1 μm to 50 μm, preferably from 15 μm to 30 μm. In particular, when the cell diameter is as small as about 30 μm, the cell depth of the polishing surface 10a is reduced, making it possible to decrease the amount of conditioning (dressing). This simplification of dressing inhibits the abrasion of the polishing pad, resulting in an effect of prolonging the life of the polishing pad 10.

When the average diameter of the cells falls below 1 μm, the resulting polishing pad 10 is comparatively easily subject to dull edge or clogging of cells with polishing waste or the like. Such a polishing pad cannot perform stable polishing and thus must be subjected to dressing more frequently. On the contrary, when the average diameter of the cells exceeds 50 μm, the resulting polishing pad tends to be subject to dispersion of cell diameters. Such a polishing pad can retain a slurry less uniformly and thus cannot exhibit a stabilized quality. Further, when the dispersion of cell diameters is remarkable, the resulting polishing pad 10 is subject to partial density difference that can possibly impede the polishing conditions.

The aforementioned bulk (apparent) density affects the cell diameter as described above but more affects the removal rate. In other words, as shown in FIG. 5, when the cell diameters are the same, the density variation causes the change of the ratio of flat portion (portion capable of polishing) to cell portion (portion capable of retaining slurry and polishing waste) on the polishing surface 10a. In order to obtain a foam having a bulk density of from 0.6 to 1.0 g/cm$^3$, preferably from 0.7 to 1.0 g/cm$^3$, by a reaction injection molding method normally involving the use of a gas-dissolved mixture of raw materials having the aforementioned inert gas dissolved therein, the bulk density can be easily adjusted by changing the speed of injection of the mixture of raw materials into the reaction injection mold 58, i.e., injection time. Alternatively, the amount of the inert gas to be dissolved in the raw material may be adjusted.

Figure 5A:
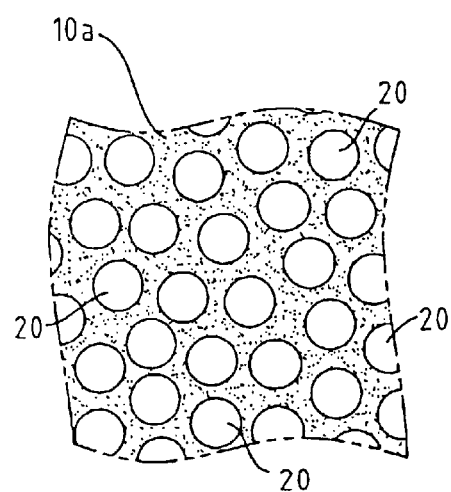
FIGS. 5A, 5B, 5C and 5D each is a schematic view illustrating the effect of the bulk density of a polishing pad on the polishing properties thereof, wherein FIGS. 5A and 5B each indicates the effect of a high bulk density and FIGS. 5C and 5D each indicates the effect of a low bulk density.
Figure 5C:
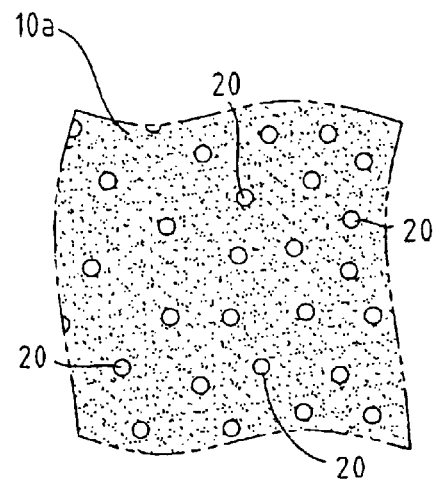
Figure 5B:
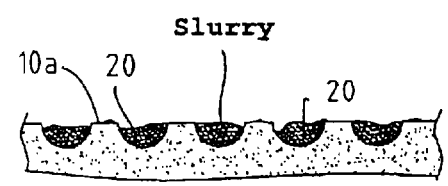
Figure 5D:
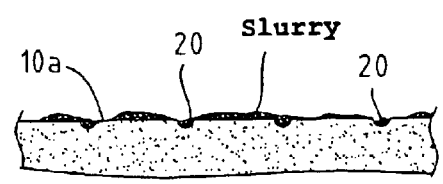

When the bulk density falls below 0.6 g/cm$^3$, the ratio of fine cells in the polishing surface 10a, i.e., the ratio of the cell portion (portion capable of retaining slurry and polishing waste) increases while the ratio of the flat portion (portion capable of polishing) decreases even if the hardness described later is sufficient (see FIG. 5A). Therefore, the time during which the slurry exists on the flat portion of the polishing surface 10a to polish the surface to be polished is reduced (see FIG. 5B), resulting in the deterioration of the removal rate. On the contrary, when the bulk density exceeds 1.0 g/cm$^3$, the polishing surface 10a becomes almost leveled (see FIG. 5C). Thus, the foam has a remarkably deteriorated capacity of retaining a slurry (see FIG. 5D), making it impossible to consume the slurry efficiently and hence adding to the running cost of polishing. Further, the drying of the slurry on the polishing surface 10a of the polishing pad 10 causes the agglomeration of abrasive particles which can cause scratching.

Taking into account the polishing properties, the hardness of the polyurethane-based foam 12 constituting the polishing pad 10 is one of important indices. In the invention, the Shore D durometer hardness of the polyurethane-based foam 12 as defined in ASTM D2240 is predetermined to a range of from 40 to 80, preferably from 55 to 75. When the Shore D durometer hardness of the polyurethane-based foam 12 falls below 40, the material is too soft and fits to the roughened surface of the object to be leveled such as wafer, making it impossible for the polishing pad to perform positive polishing starting from the raised portion. This requires a great working margin, increasing waste. On the contrary, when the Shore D durometer hardness of the polyurethane-based foam 12 exceeds 80, small pieces of the polishing pad 10 produced by scraping the polishing pad 10 during polishing causes scratching on the surface of the object to be polished. Accordingly, the Shore D durometer hardness of the polishing pad where no scratching can occur and stepped surface can be fairly eliminated is preferably from 55 to 75.

By laminating a material softer than the polyurethane-based foam 12 constituting the polishing surface 10a such as the aforementioned buffer pad 14, the uniformity of the object to be leveled can be enhanced. A polishing pad having a Shore D durometer hardness of from 55 to 75 as defined above is also advantageous in the prevention of structural working defects such as dishing or erosion as occurring with the conventional metal CMP.

The Shore D durometer hardness of the polyurethane-based foam 12 normally increases as the total OH value of the aforementioned polyol component, etc. (sum of OH value of the individual raw materials in the mixing ratio) increases. This is because when the hard segment (organic isocyanate, chain extender or crosslinking agent) constituting the polyurethane-based foam 12 is selected and increased in its amount, the polymer constituting the foam 12 becomes more rigid. For example, by increasing the isocyanate INDEX (ratio represented by isocyanate/hydroxyl group or amino group, hereinafter simply referred to as "INDEX"), the Shore D durometer hardness of the polyurethane-based foam 12 can be easily controlled.

The use of the polyurethane-based foam 12 having the aforementioned physical properties makes it possible to obtain a polishing pad 10 which can fairly eliminate stepped surface as well as exhibits an enhanced removal rate. The labilization of the removal rate by the hardness change depending on the change of the viscoelasticity of the polyurethane-based foam 12 with temperature can be avoided by the use of, as a crosslinking agent which is one of the aforementioned subsidiary raw materials, a material which becomes a polymerizable hard segment having a high cohesion such as aromatic diamine.

In general, the change of viscoelasticity is evaluated by dynamic viscoelasticity, which is a viscoelasticity observed when a periodically varying strain or stress is applied to an object. In some detail, three factors, i.e., storage modulus (G'), loss modulus (G") and tanδ (=G"/G') calculated from the two elastic moduli are used. In the invention, the aforementioned storage modulus, which is the elastic factor of a material, and the tanδ, which represents the balance of elastic factor and viscosity factor, are used to predetermine the range of change of storage modulus and tanδ at a temperature of from 10° C. to 90° C., i.e., maximum/minimum ratio to not greater than 3, that is, to predetermine the maximum value of these factors to not greater than three times the minimum value thereof. This is accomplished by adding an aromatic diamine or the like to the aforementioned crosslinking agent or main raw material in an arbitrary amount.

The addition of the aforementioned crosslinking agent has an effect of improving the aforementioned storage modulus and tanδ as well as hardness. Therefore, the added amount of the crosslinking agent must be taken into account.

As mentioned above, the polishing pad according to the invention is produced by molding a gas-dissolved raw material having an inert gas dissolved in a polyurethane-based raw material by a reaction injection molding method while arbitrarily controlling physical properties such as hardness, cell diameter and density, whereby a polyurethane-based foam suitable for polishing pad which can withstand variation of polishing conditions and attain excellent removal rate, capacity of step height reduction and uniformity can be provided. Further, by adding a material such as aromatic diamine to the polyurethane-based raw material, an effect of inhibiting the change of viscoelasticity with temperature can be exerted.

Polishing pads according to Examples 1 to 7 and Comparative Examples 1 to 3 were prepared by a reaction injection molding method wherein the foaming conditions, the molding conditions and the composition of isocyanate INDEX, crosslinking agent, etc. were varied. The polishing pad according to the invention is limited to the following examples.

(Experiment Conditions)

The following raw materials were used to prepare a polishing pad having a thickness of 1.27 mm and a lattice-shaped groove with a width of 2 mm, a pitch of 15 mm and a depth of 0.6 mm. The polishing pad thus prepared was then measured for various properties.

(Raw Materials Used)

Polyol: Trade name: SBU Polyol M-372 (172 KOH mg/g), produced by SUMITOMO BAYER URETHANE CO., LTD.

Isocyanate: Trade name: SBU Isocyanate M-390 (NCO %=23.0%), produced by SUMITOMO BAYER URETHANE CO., LTD.

Catalyst: Trade name: DABCO 33LV, produced by SANKYO AIR PRODUCTS CO., LTD

Crosslinking agent A: Trade name: Crosslinker 0644 (630 KOH mg/g), produced by SUMITOMO BAYER URETHANE CO., LTD.

Crosslinking agent B: Trade name: Sumifen VB (630 KOH mg/g), produced by SUMITOMO BAYER URETHANE CO., LTD.

(Composition and Various Conditions)

The composition and various conditions are set forth in Table 1.

TABLE 1

| | Composition | | | | | | Foaming conditions | | Molding conditions | | |
|---|---|---|---|---|---|---|---|---|---|---|---|
| | Main raw material | | | Subsidiary raw material | | | | Gas | Gas | | | |
| | | | | Crosslinking agent | | | Inert | saturation temperature | saturation pressure | Pressure in mold | Curing conditions | Injection time |
| | Polyol | Isocyanate | Catalyst | A | B | Water | gas | (° C.) | (Mpa) | (Mpa) | (° C., sec) | (sec) |
| Example 1 | 100 | INDEX = 1.20 | 0.1 | 10 | — | — | Dry air | 40 | 0.6 | Ordinary pressure | 70° C., 60 sec | 1 |
| Example 2 | 100 | INDEX = 1.20 | 0.1 | 10 | — | — | $CO_2$ | 40 | 6.0 | 20 | 70° C., 60 sec | 1 |
| Example 3 | 100 | INDEX = 1.20 | 0.1 | 10 | — | — | Dry air | 40 | 0.6 | Ordinary pressure | 70° C., 60 sec | 0.6 |
| Example 4 | 100 | INDEX = 1.20 | 0.03 | 10 | — | — | Dry air | 40 | 0.6 | Ordinary pressure | 40° C., 300 sec | 0.6 |
| Example 5 | 100 | INDEX = 1.20 | 0.1 | 10 | — | 1.0 | Dry air | 40 | 0.6 | Ordinary pressure | 70° C., 60 sec | 1 |
| Example 6 | 100 | INDEX = 1.20 | 0.1 | 10 | — | — | Dry air | 40 | 0.6 | Ordinary pressure | 70° C., 60 sec | 0.55 |
| Comparative Example 1 | 100 | INDEX = 1.08 | 0.1 | — | — | — | Dry air | 40 | 0.6 | Ordinary pressure | 70° C., 60 sec | 1 |
| Comparative Example 2 | 100 | INDEX = 0.97 | 0.1 | — | 10 | — | Dry air | 40 | 0.6 | Ordinary pressure | 70° C., 60 sec | 1 |
| Comparative Example 3 | 100 | INDEX = 1.20 | 0.1 | 15 | — | — | Dry air | 40 | 0.6 | Ordinary pressure | 70° C., 60 sec | 1 |
| Example 7 | 100 | INDEX = 1.20 | 0.1 | 15 | — | — | Dry air | 40 | 0.6 | Ordinary pressure | 70° C., 60 sec | 0.73 |

*The unit of the added amount of catalyst, crosslinking agents A and B and water, which are subsidiary raw materials, is part(s) by weight.
*In Example 5, the raw material contains water, which causes chemical foaming. In other words, cells are formed by chemical foaming method.

(Properties to be Evaluated and Evaluating Method)
(1) Physical Properties
A: Density
Measured according to JIS K 6401.

B: Hardness

Measured at a temperature of 22° C. and a relative humidity of 55% using a Shore D hardness meter defined in ASTM D 2240.

C: Average Cell Diameter

Five cells having the maximum aperture (Cells have different apertures at different sections because they are spherical. Supposing that they are in the form of true sphere, the maximum distance of the aperture of cell is defined as the diameter of aperture of spherical cell) are selected from five points of 10 mm square in a scanning electron microphotograph (SEM). These maximum diameters are averaged to determine the average cell diameter.

D, E: Maximum Value/Minimum Value of Storage Modulus and tanδ

These properties are measured by means of a dynamic viscoelastometer (produced by Rheometric Scientific F.E. Ltd.). For measurement, a method is employed involving the application of a small sinusoidal strain followed by the measurement of difference in response between viscous component and elastic component. The measurement is effected at a temperature of from 10° C. to 90° C. and a frequency of 1 Hz in a tensile mode to collect data. The maximum value of the data thus collected is divided by the minimum value of the data thus collected to obtain a numerical value to be evaluated. The aforementioned temperature range (10° C. to 90° C.) is predetermined taking into account the conditions of the slurry used during polishing.

(2) Evaluation of Polishing Properties:

As a polishing machine there was used a single CMP device (platen diameter: 500 mm) with a platen and a head for 6-inch use. Optimum objects to be leveled were each polished for every properties under the following conditions to confirm F (removal rate), G (capacity of step height reduction), H (scratchability), I (uniformity) and J (general evaluation for polishing pad from these factors). The removal rate F was evaluated by numeral value. The scratchability H was evaluated according to a two-step criterion (OK and NG). The capacity of step height reduction G and the uniformity I were evaluated according to a four-step criterion (E: excellent; G: good; F: slightly poor; P: poor). The general evaluation J was evaluated according to a three-step criterion (G: suitable for use; F: usable; P: not usable).

Conditions

Rotary speed of platen and head: 100 r.p.m.
Polishing pressure: 34 kPa
Abrasive: General-purpose $SiO_2$ slurry for oxide CMP
Flow rate of abrasive: 150 ml/min For reference, a polishing pad which is used as CMP on a standard basis at present (trade name: IC-1000, produced by Rodel Nitta Company) was evaluated in the same manner as mentioned above.

(Results)

The results are set forth in Table 2 below. In other words, all the polishing pads according to the invention (Examples 1 to 7) were confirmed usable for polishing of various semiconductor materials such as semiconductor wafer as can be seen in the general evaluation. In particular, the polishing pads of Examples 1 and 2 of the present invention not only were confirmed to stand comparison with the reference polishing pad but also exhibited far better capacity of step height reduction than the reference polishing pad.

TABLE 2

| | Various physical properties | | | | | Polishing properties | | | | |
|---|---|---|---|---|---|---|---|---|---|---|
| | A Density (g/cm³) | B D hardness | C Cell diameter (μm) | D Max/min of storage modulus | E Max/min of Tanδ | F Removal rate | G Capacity of step height reduction | H Scratch-ability | I Uniformity | J General evaluation |
| Example 1 | 1.00 | 65 | 15 | 1.5 | 2.5 | 3,300 | E | OK | G | G |
| Example 2 | 1.00 | 65 | 3 (lower limit) | 1.5 | 2.5 | 3,300–2,800 | E | OK | G | G |
| Example 3 | 0.60 | 55 | 30 | 1.5 | 2.5 | 2,500 | G | OK | G | G |
| Example 4 | 0.60 | 55 | 150 (lower limit) | 1.5 | 2.5 | 2,300 | G | OK | G | G |
| Example 5 | 0.73–0.60 | 55 | 100 (uneven) | 1.5 | 2.5 | 2,800 | G | OK | F–P | F |
| Example 6 | 0.55 | 50 | 35 | 1.5 | 2.5 | 1,900 | F | OK | G | F |
| Comparative Example 1 | 1.00 | 38 | 15 | 0.5 | 0.5 | 800 | P | OK | — | P |
| Comparative Example 2 | 1.00 | 55 | 15 | 12 (dependent on temperature) | 10 (definite transition point) | 1,500–2,900 (instable) | F | OK | P | P |
| Comparative Example 3 | 1.00 | 85 | 15 | 1.0 | 0.3 | 3,600 | E | NG | P | P |
| Example 7 | 0.73 | 75 | 25 | 1.0 | 0.3 | 3,500 | E | OK | F | G |
| Reference Example | 0.73 | 55 | 70 | 2.5 | 3.2 | 3,200 | F | OK | G | G |

Referring to the temperature dependence, the polishing pads having a small ratio of maximum value to minimum value of storage modulus in the results maintain its rigidity regardless of temperature even during temperature rise. Further, the smaller the ratio of maximum value to minimum value (change) of tanδ at various temperatures indicating the transition point of material is, i.e., the broader the peak of tanδ curve plotted with temperature as abscissa is, the smaller is the relative change of modulus of the material. Thus, all these materials are suitable for polishing pad.

While the invention has been described in detail and with reference to specific embodiments thereof, it will be apparent to one skilled in the art that various changes and modifications can be made therein without departing from the spirit and scope thereof.

This application is based on Japanese patent application No. 2001-254971 filed on Aug. 24, 2001, the entire contents thereof being hereby incorporated by reference.

What is claimed is:

1. A polishing pad comprising a polyurethane-based foam having a desired shape obtained by a process which comprises mixing a polyurethane or polyurea as a main raw material with various subsidiary raw materials, dissolving an inert gas in the mixture under pressure to obtain a gas-dissolved raw material, and then injecting the gas-dissolved raw material into a reaction injection mold by a reaction injection molding method, wherein the polyurethane-based foam has small and uniform cells suitable for polishing semiconductor material obtained by the reaction in the injection mold.

2. The polishing pad as claimed in claim 1, wherein the average diameter of the cells is predetermined and ranges from 1 $\mu$m to 50 $\mu$m.

3. The polishing pad as claimed in claim 2, wherein the average diameter of the cells is predetermined and ranges from 15 $\mu$m to 30 $\mu$m.

4. The polishing pad as claimed in claim 1, wherein the bulk density of the polyurethane-based foam is predetermined and ranges from 0.6 to 1.0 g/cm$^3$.

5. The polishing pad as claimed in claim 4, wherein the bulk density of the polyurethane-based foam is predetermined and ranges from 0.7 to 1.0 g/cm$^3$.

6. The polishing pad as claimed in claim 1, wherein the Shore D durometer hardness of the polyurethane-based foam as defined in ASTM D2240 is predetermined and ranges from 40 to 80.

7. The polishing pad as claimed in claim 6, wherein the Shore D durometer hardness of the polyurethane-based foam as defined in ASTM D2240 is predetermined and ranges from 55 to 75.

8. The polishing pad as claimed in claim 1, wherein an aromatic diamine is used as one of the subsidiary raw materials to thereby improve the crystallinity of the resulting foam so that the maximum value of storage modulus and tan$\delta$ at a temperature from 10° C. to 90° C. each fall within three times the minimum values thereof, respectively.

9. The polishing pad as claimed in claim 1, wherein the reaction injection mold is provided with a predetermined pattern so that the pattern is transferred to the surface of the polyurethane-based foam.

10. The polishing pad as claimed in claim 1, wherein the inert gas is selected from the group consisting of dry air, dried nitrogen gas, $CO_2$ and Ar.

11. The polishing pad as claimed in claim 1, wherein the inert gas is dissolved in the mixture at a pressure ranging from 0.1 to 50 MPa.

12. The polishing pad as claimed in claim 1, wherein the subsidiary raw material is selected from the group consisting of a catalyst, a chain extender and a crosslinking agent.

* * * * *